Oct. 30, 1934.  F. E. KRAUSS  1,979,201
METHOD OF EXTENDING THE COOLING ACTION OF ICE
Filed July 10, 1930
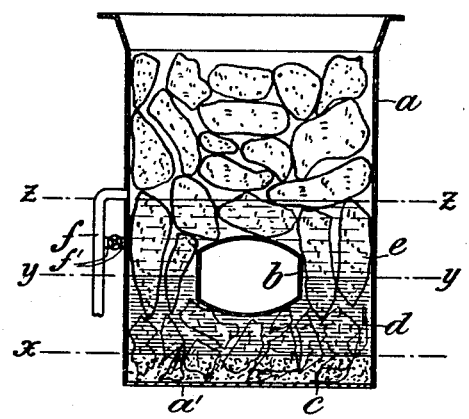
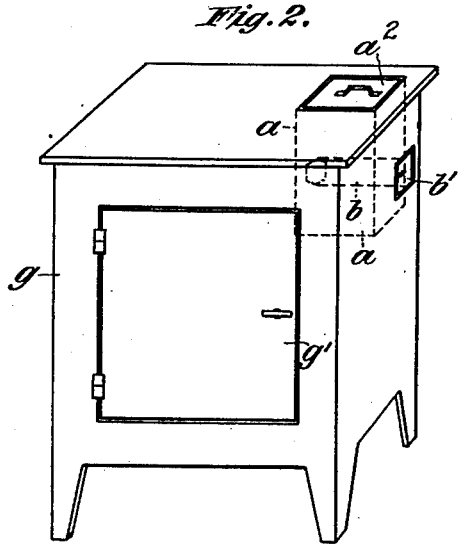
F. E. Krauss
INVENTOR
By: Marks & Clerk Patented Oct. 30, 1934

1,979,201

UNITED STATES PATENT OFFICE 1,979,201

METHOD OF EXTENDING THE COOLING ACTION OF ICE

Friedrich Emil Krauss, Schwarzenberg, Germany

Application July 10, 1930, Serial No. 467,111
In Germany May 23, 1930

3 Claims. (Cl. 62—170)

In order to produce an intense cooling effect in refrigerators it is common to mix salt with the ice used therein. However, the melted ice produces a continuously increasing dilution of the salt mixture so that the action of the salt is thereby substantially reduced and the ice also melts more quickly. Consequently, the consumption of ice for such refrigerators is very great.

According to the present invention, a prolongation of the refrigeration of the ice is obtained by providing in the refrigerator above the salt mixture a layer of fat which is not soluble in water and is of greater specific weight than water, the ice penetrating the layer of fat and immersing in the salt mixture. Owing to this inserted layer of fat, the melted ice which immerses in the salt mixture undergoes a buoyancy in the heavy layer of fat above the salt mixture and the rapid dilution of the salt mixture is thereby prevented. On the other hand, an enrichment of melted ice having a substantial salt content takes place whereby a too quick melting of the ice is prevented. Owing to the continuous supply of ice and discharge of melted ice above the layer of fat, provision is made that the ice continuously immerses through the layer of fat into the salt mixture.

The invention is illustrated diagrammatically and by way of example on the accompanying drawing in which Figure 1 is a vertical section through an ice receptacle designed for use in connection with my present improved method, and Figure 2 is a perspective view of a refrigerator equipped with that ice receptacle.

On the drawing, $a$, Fig. 1, is a vessel of any suitable size and shape through which extends a horizontal cooling tube $b$, the dimensions of which are such that it is able to receive small basins or the like, for instance such as used for the manufacture of ices. This tube is accessible from one of the sides of the refrigerator, as shown in Fig. 2. The vessel $a$ is arranged in one of the upper corners of the refrigerator. $f$ is a bent overflow pipe extending forth from the vessel $a$ in about the middle of the same (Fig. 1).

On the bottom $a'$ of the vessel is a layer of salt $c$, for instance ordinary red salt, and upon this layer is a layer $d$ of the fat, such as triacetin, which is an odorless fat particularly adapted to the purpose. The thickness of this layer $d$ is such that it extends upwardly to about the middle of the tube $b$, as indicated by the line $y$—$y$. $x$—$x$ denotes the plane in which the fat and the salt contact with one another.

When the salt and the fat have been introduced into the vessel $a$, the ice pieces $e$ are placed upon the fat. The lowermost pieces penetrate the fat, and come in contact also with the salt. It is essential for the good effect of the device that the ice and the fat are continually in intimate contact with one another. In order to prevent the ice from being so much lifted by the melted ice that the solid pieces come out of contact with the fat, the overflow pipe $f$ is provided through which the excess of the melted ice can continually flow away. If the amount of ice is comparatively small and, thus, the amount of melted ice is correspondingly small, the pipe $f$ may extend forth from the vessel $a$ at a lower point, or a separate intermediate connection between the vessel and the pipe may be provided, as shown at $f'$ where there is a short branch pipe provided with a valve. If desired, more than only one such branch connection may be provided.

Generally, the position of the cooling tube $b$ on the one hand and of the layers of the fat and the melted ice on the other hand is to be such that about the upper half of said tube is located in the melted ice and about the lower half in the fat.

The arrangement of the vessel $a$ in the refrigerator $g$ is distinctly shown in Fig. 2 and a detailed description of this simple arrangement can obviously be dispensed with. $a^2$ denotes the cover of the vessel $a$, $b'$ a separate door for the cooling tube $b$, and $g'$ is the door of the refrigerator. While this latter is intended for normal use, that is to say, for the cooling or keeping cool of normal amounts of food, the tube $b$ may be used separately for certain small amounts, such as ices and the like, such small amounts do not, thus, necessitate opening the door $g'$.

Tests made have repeatedly confirmed the fact that by inserting the layer of fat $d$, having a higher specific weight than water, between the layer of salt $c$ and the melted ice, the ice is preserved or the melting thereof is retarded. This is explained by the fact that the layer of fat $d$ isolates the ice or melted ice from the layer of salt because each drop of water melted from the ice is driven upward so that the salt water does not merge into the layer of melted ice and the salt is not so quickly dissolved and is also not substantially diluted by the melted ice. The melted ice is retained to be discharged on attaining a certain height in the container $a$.

It may be stated that owing to its weight the ice is forced into the layer of salt. Due to the fact that the layer of salt is preserved longer, the ice cannot melt so quickly.

I claim:

1. The method of extending the cooling action of ice with the aid of a salt adapted to lower the freezing point of water, said method consisting in inserting between a layer of the respective salt and the melted ice a layer of a fat having a greater specific weight than water.

2. A refrigerator having therein pieces of ice and a salt adapted to lower the freezing point of the melted ice, the pieces of ice being above the salt mixture, a layer of fat which is insoluble in water and has a greater specific gravity than water and which rests between the salt and most of the ice allowing some of the ice to penetrate the layer of fat and to immerse in the salt mixture.

3. The method as claimed in claim 1, characterized by the fact that the melted ice is maintained at a predetermined level above the layer of fat.

FRIEDRICH EMIL KRAUSS.